United States Patent [19]

Kew et al.

[11] Patent Number: 5,240,599
[45] Date of Patent: Aug. 31, 1993

[54] APPARATUS FOR TREATMENT OF WASTE WATER SLUDGE

[75] Inventors: S. Alan Kew, Falmouth Foreside; Robert M. Kritzer, Scarborough; Bruce E. Soule, Yarmouth, all of Me.

[73] Assignee: Kinetic Dispersion Corporation, Scarborough, Me.

[21] Appl. No.: 837,076

[22] Filed: Feb. 18, 1992

[51] Int. Cl.⁵ ............................................. B01F 5/12
[52] U.S. Cl. ..................... 210/173; 210/175; 210/188; 210/219; 210/221.2; 210/512.1; 209/169; 241/39; 366/263; 366/264
[58] Field of Search ............ 210/173, 175, 219, 221.2, 210/512.1, 188; 209/169; 241/39, 46.17, 47.50; 366/263, 264

[56] References Cited

U.S. PATENT DOCUMENTS

| | | |
|---|---|---|
| Re. 26,931 | 7/1970 | Valdespino . |
| 668,211 | 2/1901 | Powter . |
| 2,024,986 | 12/1935 | Durdin, Jr. . |
| 2,297,009 | 9/1942 | Mead et al. . |
| 2,479,403 | 8/1949 | Powers . |
| 2,628,081 | 2/1953 | Laird . |
| 2,706,621 | 4/1955 | Laird . |
| 3,271,304 | 9/1966 | Valdespino et al. . |
| 3,311,239 | 3/1967 | Valdespino et al. . |
| 3,497,064 | 2/1970 | Valdespino . |
| 3,620,371 | 11/1971 | Valdespino . |
| 4,347,004 | 9/1982 | Platts ................................ 366/264 |
| 4,959,183 | 9/1990 | Jameson ........................ 210/221.1 |

Primary Examiner—Robert A. Dawson
Assistant Examiner—David Reifsnyder
Attorney, Agent, or Firm—Ralph W. Selitto, Jr.

[57] ABSTRACT

A method and apparatus for fragmenting waste water sludge particles to destroy sludge particles and to enhance a dewatering process performed on the sludge. Sludge is passed through a slotted rotor that centrifugally propels the sludge through slots in a surrounding annular stator. Sludge particles forcibly impact against the side surfaces of the stator slots to fragment into smaller sized particles. During the fragmentation process water located in the pores of the sludge particles is released. The free water can later be separated from the sludge in a dewatering apparatus. When passing through the rotor and stator slots, organic cells are broken apart and a portion of each is converted to dissolved sugars and proteins.

36 Claims, 3 Drawing Sheets

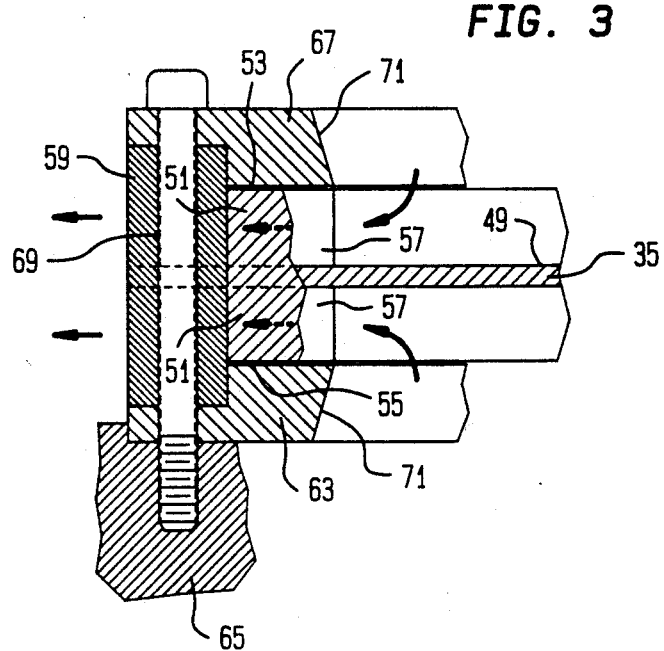
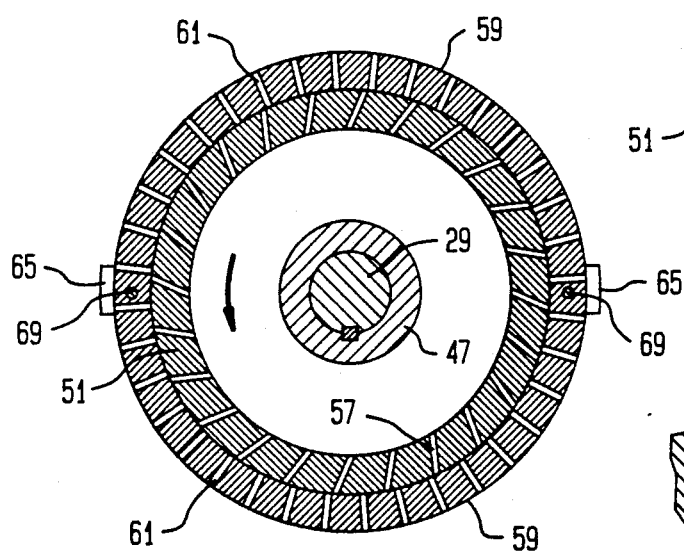
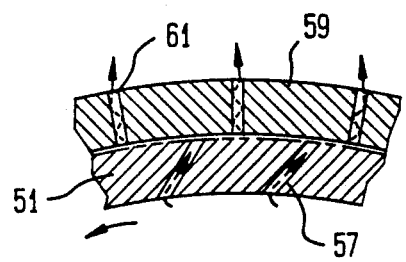
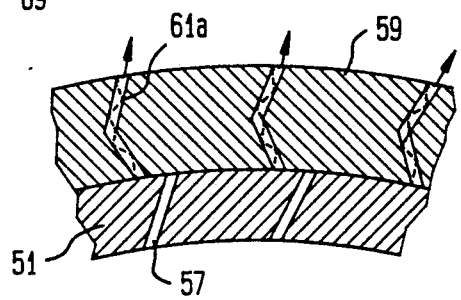
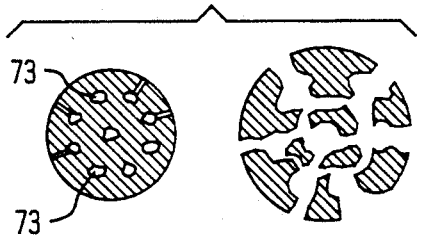

APPARATUS FOR TREATMENT OF WASTE WATER SLUDGE

BACKGROUND OF THE INVENTION

This invention relates to waste water sludge treatment, and more particularly to a method and apparatus for mechanically shearing and breaking apart solid particulates in waste water sludge, prior to the dewatering treatment. The invention is applicable to waste water sludges (sludges) generated in a range of waste water treatments, e.g., municipal water systems, paper manufacturing plants, plating facilities, automobile plants, textile plants, and plastics manufacturing plants.

Commonly, waste water is treated to remove contaminants that would otherwise prevent reuse of the water in potable water systems or that would contaminate the ground water. Similarly, other waste liquids are treated to remove contaminants that might prevent reuse of the liquids in industrial processes. Such contaminants can include solid particulate matter, or dissolved acids, metallic salts and organic alcohols, as well as dissolved odorous gases. In the case of solid particulate contaminants, the contaminants are separated out of the liquid as a sludge.

The present invention is concerned with treatment of the waste water sludge after its generation and separation from the waste liquid. The invention is applicable to sludges generated in various types of waste liquids, i.e., water or other liquids. For convenience, the term "waste water" is used to generically describe waste liquids containing solid sludge contaminants.

Treatment of waste waters often involves pumping the waste water into a large settling tank. The water containing suspended solids is then allowed to remain in the settling tank, for a period of time sufficient to permit the solid particulates to gravitationally settle to the bottom of the tank as a sludge.

In another type of treatment, air bubbles are injected into the waste water prior to its admission to the tank; the air bubbles attach to the solid particulates to provide a lighter particulate condition. In the settling tank, the lighter particulates collect on the liquid surface, where they are skimmed off by an overhead traveling belt-type collector as a thickened sludge. The heavier particulates settle to the bottom of the tank as a second separate sludge.

Sludges can also be produced as a by product of an aerobic aeration process, wherein an aeration unit is included in an aeration tank to bring gaseous air (oxygen) into contact with the particulates. The air is consumed by microorganisms in the waste water to produce a microbial floc, i.e., activated sludge, and the floc settles to the bottom of the settling tank, where it can be removed from the effluent liquid phase.

Another process involves anaerobic digestion, wherein the waste water is placed in a closed tank. The closed system allows biochemical processes to take place, whereby some of the acids in the waste water are converted to methane gas and carbon dioxide, and solid particulates are thus consumed, or changed, to a liquid or gaseous form. A quantity of sludge remains as a by-product of the process. Typically, the tank is heated to an elevated temperature, at, or near, 95° F., in order to keep the process ongoing. The methane gas is removed through a vent in the top wall of the tank, and the sludge is removed through a valved port in the tank bottom wall.

Sludge generated in the above-described conventional waste water treatments, is commonly disposed of by incineration, landfill operations, or ocean deposition. In some cases, the sludge is converted into fertilizer for agricultural use. A common problem associated with economical disposal of the various waste water sludges, is the high water content of the sludge. Typically the sludge will have a water content of from about ninety percent to about ninety five percent, with only five to ten percent of the sludge mass being solids. This fact is an obstacle to the economical disposal of the sludge, since it increases the total sludge quantity that has to be handled. The high water content also makes the sludge somewhat more difficult to handle, since the sludge is in a thick, viscous, semi-liquid condition.

In an effort to increase the solids content in the sludge, the raw separated sludge has been subjected to various dewatering treatments, including vacuum filtration, centrifugation, pressure filtration, and drying on sand beds. However, these post-formation dewatering treatments have only been partially successful. The sludges resulting from these dewatering treatments still have only relatively small solids contents. Typically, the solids content of so-called dewatered sludge is only about twenty to forty percent, with the remaining eighty percent to sixty percent, being water.

The high water content of so-called dewatered sludge is due to the fact that much of the water is contained within the pores of the solid particles or within narrow channels, formed between agglomerated particles. Each particle is a relatively porous cellular structure, that acts somewhat like a sponge, to absorb and retain water molecules within the particle mass. Conventional dewatering processes are relatively ineffective in drawing, or extracting, water from the pores formed within the solid particles.

SUMMARY OF THE INVENTION

The present invention relates to a method and apparatus for mechanically shearing and breaking apart solid particles, also referred herein to as particulates, in waste water sludge, prior to the dewatering treatment. By thus breaking the particulates into smaller size fragments, it is possible to break open the pores or cells within the particles, thereby freeing the water that had been absorbed into the pores of the larger sized particles.

It is theorized that sludge particulates can be subjected to a rapid and violent rupture action that can volatilize or convert biological cell material in the solid particles into dissolved sugars and proteins. The sludge containing ruptured and fragmented solid particles can subsequently be subjected to aerobic and/or anaerobic digestion, prior to a final dewatering treatment.

The resulting reduction in the concentration of total suspended solids results in less quantity which must be handled by further processing, i.e., less solid material to be dewatered, less to be stored, less to be transported to disposal, and less to be disposed of in landfills, by land spreading, or by incinerating.

The destruction of cell structures and the breaking up of solid particles, results in a sludge that is more easily digestible, using anaerobic or aerobic digestion systems. Because the particle sizes are reduced and cells are broken, which makes available the cell protoplasm for further synthesis, the digestion processes work to metabolize a greater portion of the sludge than can normally be metabolized.

The destruction of particulate matter and cell structures results in a waste water sludge that is more easily dewatered, using conventional dewatering equipment. The bond between water molecules and solid particles and cells is broken by the impingement and mechanical shear, and when conditioned with conditioning chemicals, the sludge releases the water more easily, resulting in a drier sludge than is normally produced by the same dewatering equipment.

The destruction of cell structures, and the breaking up of solid particles, prior to recycling the secondary sludge, to either the primary clarifiers or to the aeration basins, results in a recycle sludge that is more easily synthesized in the activated sludge process. The cell material and particulate matter is in a form that is finer, and exposes more surface area for cell protoplasm synthesis. This results in greater destruction of organic material in the activated sludge process.

BRIEF DESCRIPTION OF THE DRAWINGS

FIG. 2, is an enlarged sectional view, taken generally along line 2—2 in FIG. 1.

FIG. 3, is a fragmentary sectional view, of a structural detail, used in the FIG. 1 apparatus.

FIG. 4, is an enlarged fragmentary view, showing a passage arrangement, used in the FIG. 2 construction.

FIG. 5, is a view similar to FIG. 4, but illustrating an alternate passage arrangement.

FIG. 6, is a diagrammatic view of a sludge particle in its initial state and after fragmentation.

DESCRIPTION OF THE PREFERRED EMBODIMENTS OF THE PRESENT INVENTION

Figure 1:
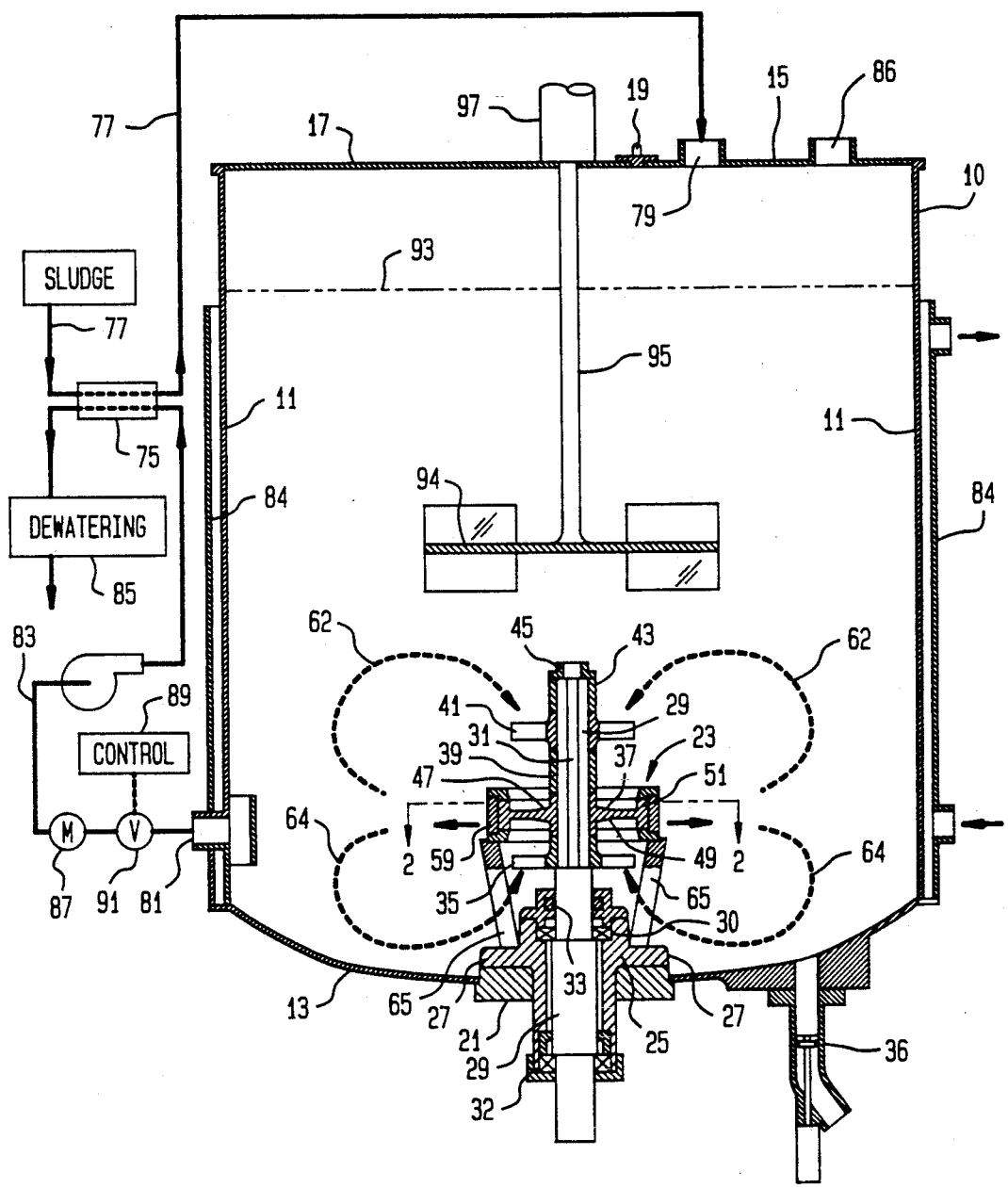
FIG. 1, is a view, partly schematic, of an apparatus embodying features of the present invention.

FIG. 1, is a view, partly schematic, of an apparatus embodying features of the present invention.

Referring now to FIG. 1, there is shown an upstanding cylindrical sludge tank, depicted as 10, that includes a cylindrical side wall 11, bottom wall 13, and fixed cover 15. The tank may be of other configurations. A top access closure 17, is hingedly connected to fixed cover 15, by means of a piano hinge 19. Tank bottom wall 13, includes a circular base plate 21, that serves as a mounting means for a rotor-stator assembly, designated generally by numeral 23.

The rotor-stator assembly 23, comprises a generally tubular housing 25, having a flange 27, bolted to base plate 21, whereby the assembly 23 can be manufactured as a unit for subsequent installation within the tank 10. A vertically oriented shaft 29, extends through housing 25, so that the lower end portion of the shaft 29, is exposed for connection to a drive motor, or a drive pulley, for a belt-driven system. The drive motor, or drive pulley, is not shown in the drawing.

However, the rotor 37, would in practice be driven at a speed, ranging preferably from about five thousand to about eleven thousand feet per minute. Rotor speeds above eleven thousand feet per minute, are generally considered impractical, because of flow cavitation effects and power efficiency considerations, relating to the operation of rotor 37, that is to be driven by the shaft 29.

Shaft 29, is rotatably supported by an upper bearing 30 and a lower bearing 32. A seal 33, is provided to prevent leakage along the shaft 29 surface. Shaft 29, has an axial keyway 31 extending therealong, for removably affixing a stack of annular components to the shaft. These components comprise a lower axial flow propeller 35, a sludge-discharging rotor 37, a spacer 39, an upper axial flow propeller 41, and a second spacer 43. The upper end of the shaft 29 is threaded to receive a nut 45, whereby the stacked components are removably affixed to the shaft.

The bladings for propellers 35 and 41, are configured such that the upper propeller 41, produces a downflowing sludge stream into rotor 37, whereas the lower propeller 35 produces an upflowing sludge stream into the rotor 37. Rotor 37, comprises an annular hub 47, affixed to drive shaft 29, an imperforate web wall 49, extending radially outwardly from the hub 47, in a plane normal to the rotor 37 rotational axis, and an axially thickened peripheral rim wall 51, at the outer edge of web wall 49.

FIG. 3, is a fragmentary sectional view, of a structural detail, used in the FIG. 1 apparatus.

As best seen in FIG. 3, rim wall 51, extends axially in opposite directions from wall 49, such that the flat end edges 53 and 55, of the rim wall 49, are equidistant from the plane of wall 49.

Rim wall 51, has a number of slot-like passages 57, hereinafter the passages 57 are referred to as slots, the slots 57, extending therethrough at evenly spaced points around the rim wall 51 periphery. Each slot 57, extends completely through wall 51 from its inner side edge to its outer side edge, whereby each slot 57 acts as a sludge particle passageway. There are two sets of slots 57, namely an upper set of slots 57, located above the plane of web wall 49, and a lower set of slots located below the plane of web wall 49. Each lower slot 57, extends downwardly from the plane of wall 49, to end edge 55, of the rim wall 51. Each upper slot 57, extends upwardly from the plane of wall 49, to end edge 53, of the rim wall 51.

FIG. 2, is an enlarged sectional view, taken generally along line 2—2 in FIG. 1.

Rotor 37, is rotatably positioned within an annual cylindrical stator 59, that has two sets of slot-like passages 61, evenly spaced therearound. As seen in FIGS. 2 and 3, the inner cylindrical side surface of the stator 59 is in close physical proximity to the outer cylindrical side surface of the rotor 37, whereby sludge particles discharged from the rotor slots 57, is immediately directed into the stator slots 61. Stator slots 61 intermittently mate with rotor slots 57, as the rotor 37 rotates on its central axis. Sludge is thereby passed from rotor slots 57, into stator slots 61, for discharge to the annular space surrounding the stator 59. There are two separate discharge streams, namely an upper stream, through the upper sets of slots 61 and a lower stream through the lower set of slots 61.

FIG. 1, shows the general sludge flow pattern generated within the sludge tank 10. As shown, there is an upper toroidal flow path 62, generated by the upper set of rotor slots 57, and a lower toroidal flow path 64 generated by the lower set of rotor slots 57. The axial flow impellers, i.e., propellers 41 and 35, reinforce and maintain the respective flow paths, whereby the sludge is continuously recirculated from the annular zone surrounding stator 59, back into rotor 37. The toroidal flow paths induce sludge bordering the respective paths to be drawn into the rotor 37, such that essentially all of the sludge in the tank is passed through the rotor-stator assembly 23 over a period of time. However, it is envisioned that an embodiment may be constructed without the inclusion of an axial flow propeller.

Stator 59 may be supported in a variety of different ways. As shown, the stator 59, is seated on a lower annular shroud wall 63, shown in FIG. 3, that extends radially inwardly along the lower edge of rotor rim wall 51. The shroud wall 63, is attached, or seated, on two arms 65, that extend upwardly from housing 25. An upper annular shroud wall 67, overlies stator 59, and the upper edge of rotor rim wall 51. Bolts 69, extend through the two shroud walls, i.e., 63 and 67, and the annular stator 59, whereby the stator 59, is supported in a fixed position above the tank bottom wall 13.

Shroud walls 63 and 67, are affixed to the stator 59, with slight clearances from the rotor 37, such that the inner edges 71, of the fixed shroud walls guide the incoming sludge into the rotor annular spaces between hub 47 and rim wall 51. Within the rotor 37, the sludge turns radially outwardly for passage through the various slots 57. Part of the impetus for sludge flow is provided by propellers 35 and 41. However, the surfaces of the rotor slots 57, also act as impeller surfaces, whereby the sludge is centrifugally thrown outwardly through rotor passages i.e., slots 57, and then into the stator passage slots 61.

FIG. 4, is an enlarged fragmentary view, showing a passage arrangement, used in the FIG. 2 construction.

FIG. 4 shows the sludge flow through representative passages in the rotor 37 and stator 59. The sludge has both a radial flow component and a circumferential flow component, while it is moving through rotor slot 57. As the sludge leaves rotor slot 57, the circumferential flow component causes the sludge particles to strike the wall of stator slot 61, at an angle, thereby subjecting the particles to an impact force. The sludge particle rebounds angularly, to strike the other slot wall at an oblique angle. Depending on the radial thickness of the stator 59, the particle may again rebound back against the first-mentioned wall surface of slot 61. With each impact against a wall surface of slot 61, the sludge particle is subjected to a destructive fragmentation force. The sludge particle is also subjected to some shearing forces during the travel from the rotor passage, or slot 57, into the stator passage, or slot 61. The predominating fragmentation force is believed to be an impact force in stator slots 61.

Slots 57 and 61, are preferably the same width, such that the sludge stream discharged from a given slot 57, is at least partially captured by the next slot 61, encountered by the sludge stream. The preferred slot width ranges from about three thirty-second's of an inch, to about three-eighths of an inch. The radial thickness dimension of the stator 59 wall, is preferably at least one inch, which is sufficient to produce multiple impacts of the sludge particles against the slot 61 surfaces. Greater stator wall thicknesses can be employed to advantage, where desired.

FIG. 5, is a view similar to FIG. 4, but illustrating an alternate passage arrangement.

As shown in FIG. 4, the stator slots 61 are radially oriented. However, the stator slots 61, can, if preferred, have non-radial orientations. For example, FIG. 5 shows slots 61a having a non-radial orientation. In this case, the entrance end of each slot 61a, has one orientation, and the exit end of each slot 61a, has a different orientation. The exact slot orientation is not critical to practice of the present invention. If the stator slots 61 are angled relative to the rotor slots 57, as shown in FIG. 4, there may be a slightly greater impact force, due to the angle of attack on the slot 61 wall surfaces.

Preferably, both sets of slots are evenly spaced apart, as shown in FIG. 2. However, the spacing of the rotor slots 57, can be different than the spacing of the stator slots 61. The slot spacing is selected to achieve a relatively high linear speed of the sludge particles in slots 61, with minimal surging, flow variation, or dead spots in the flow pattern.

FIG. 6, is a diagrammatic view of a sludge particle in its initial state and after fragmentation.

FIG. 6, schematically depicts the fragmentation action of a representative sludge particle. The particle is a porous cellular mass, having a multiplicity of internal pores or voids 73, that may, or may not, be connected. The sludge mass will be saturated with water such that the pores are water-filled. The fragmentation forces can be expected to produce some separation in the sludge particle along failure lines generated from the various internal pores 73. As the particle is fragmented, as shown at the right in FIG. 6, the cells are exposed or opened, such that water is freed from the interior of the cells. The freed water has a reduced attachment to the sludge fragments, so that the freed water is later easily separated from the sludge fragments in a dewatering apparatus (not shown in the drawing). The fragmentation process, is viewed as a process for freeing the entrapped water, by rupturing the internal cells that act as water storage chambers within the original sludge particle, as well as a process to convert sludge cells to dissolved sugars and proteins.

The apparatus of FIG. 1, may be constructed in various sizes and capacities, as preferred. However, in one embodiment, the tank 10, had a diameter of about sixty inches, and the corresponding stator 59, had a diameter of about fifteen inches. The ratio of an inside dimension of the tank to stator diameter, is preferably from about two to about twelve to one, thus providing a substantial annual clearance between the stator 59 and the tank side wall 11, for recirculation of sludge through toroidal paths 62 and 64.

Referring again to FIG. 1, there is schematically shown a system for circulating sludge through tank 10. The circulation system includes a heat exchanger 75. Sludge, from a settling tank, aeration tank, or other coagulation mechanism, flows through the heat exchanger 75. along a path, i.e., line 77. The sludge is introduced to tank 10, through an inlet 79, located in the tank cover 15. Sludge processed in tank 10, is discharged through an outlet 81 near the tank bottom wall 13. The treated sludge flows out along path, i.e., line 83, that extends through heat exchanger 75. The outgoing sludge, thus, exchanges heat with the incoming sludge, flowing through line 77. Usually the outgoing sludge will be at a higher temperature than the incoming sludge, therefore, the sludge in line 83, will act as a preheater for the incoming sludge in line 77.

Line 83, will feed the treated sludge to a dewatering unit 85, where a substantial percentage of the now-freed water is separated from the sludge particulates. The dewatering operation is enhanced, i.e., becoming more effective, because the liquid phase in the line 83 slurry, is to a great extent freed from the fragmented sludge particulates. The dewatering apparatus is now not required to extract the water from within the sludge particles. Further, because some of the sludge cells are converted to sugars and proteins, there is now a smaller quantity of solids in the sludge, to be disposed of.

Various types of conventional dewatering apparatus can be used. For example, the dewatering apparatus can include a sand bed having a gravel bottom for drainage. The sludge is deposited on the sand bed for air drying of the particulates, with water draining through the sand bed.

Another type of dewatering apparatus involves passage of the sludge through a porous medium under a vacuum operating force. The medium can be located on a rotary drum that has a sludge inlet connected to the drum interior. The vacuum draws water outwardly through the filtering medium, leaving a filter cake of sludge on the drum interior surface.

Pressure filtration can also be used to remove water from sludge. Filter cloths are supported on frames arranged in a parallel array. Sludge under pressure enters spaces between the frames, such that clear filtrate passes through the various cloth panels, and the dewatered sludge collects as a filter cake on the cloth panels.

Centrifugal separation techniques can also be used for dewatering sludge. The sludge is fed into a rotating bowl, where the sludge collects on the bowl's interior surface, and water exits through an opening in the bowl end wall. Finally, a helical blade scrapes the filter cake from the bowl surface.

Another method of sludge dewatering involves passage of sludge into a belt filter press. Two opposed traveling belts gradually come together along a sludge treatment zone. Sludge is squeezed and carried along the opposed belt surfaces. Water drains out of the squeezed sludge for drainage through the lowermost belt.

The apparatus of the present invention as shown in FIG. 1, can be readily used with any of the above-described dewatering mechanisms. In each case, the dewatering mechanism will have an increased effectiveness, due to the sludge particle-fragmentation treatment previously provided by the FIG. 1 apparatus. The FIG. 1 apparatus, has been tested and has been found to achieve the desired beneficial results. The result is effected by the nature of the incoming sludge, as well as the sludge detention time in tank 10. The longer the detention time, the greater the increase in solids concentration achieved. In one case, in which the detention time in tank 10 was thirty minutes, the solids concentration in the dewatered sludge was increased by about seventy percent. The term "detention time" is somewhat arbitrarily arrived at by dividing the tank slurry volume, by the sludge feed rate through the tank. For example, if the tank has a slurry volume of sixty gallons, and the sludge feed rate is two gallons per minute, then, the detention time is calculated as thirty minutes. Optimum detention time for each sludge must be determined before selecting the final process tank(s) size.

Sludge flow through tank 10, can be controlled in various ways. As shown in FIG. 1, a flow meter 87, is arranged in line 83, in order to measure the flow rate. An electronic signal is fed to a motor operator in a controller 89 for flow control valve 91, whereby, the flow through line 83 is regulated or controlled. The sludge flow can also be regulated as a function of the liquid level in tank 10. In normal operation, the tank liquid level will be relatively close to cover 15, e.g., at the level designated by numeral 93 in FIG. 1. The tank can periodically also be cleaned of sludge accumulations, by means of a sludge drain valve 36.

In order to achieve a relatively undisturbed toroidal flow path 62, as shown in FIG. 1, a flat baffle plate 94 can be provided directly above the upper propeller 41. The baffle plate 94, is preferably adjustable vertically to obtain the best sludge guidance position. As shown, the baffle 94 is carried on a rod 95, that extends from an air cylinder 97, mounted on closure 17. Cylinder actuation can be used to raise or lower the baffle 94.

Figure 7:
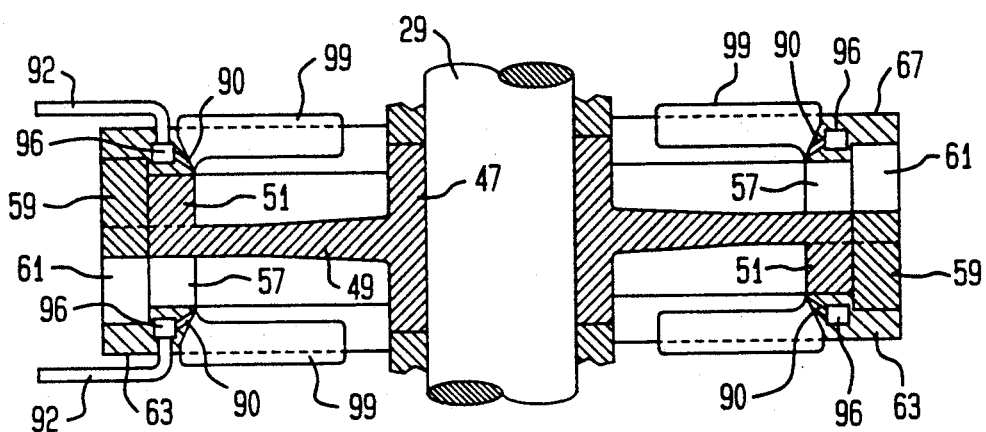
FIG. 7, is a view taken in the same direction as FIG. 3, but through an alternate apparatus embodying the present invention.

FIG. 7, is a view taken in the same direction as FIG. 3, but through an alternate apparatus embodying the present invention.

FIG. 7, illustrates two additional features that can be incorporated, if desired, into the rotor-stator assembly 23, in order to achieve certain added effects. As shown in FIG. 7, each shroud wall, 63 or 67, is equipped with a number of flow straightener vanes 99, extending toward the rotor 37 rotational axis. Each straightener vane 99, extends on a radial line passing through the axis of shaft 29, whereby the sludge assumes a generally axial motion as it enters the rotor 37. The straightener vanes 99, remove a substantial portion of the rotational flow component generated by the associated propeller 35 or 41. The number, size, and configuration of straightener vanes 99, may be varied. For example, eight vanes can be used.

The principal reason for using vanes 99, is to increase the sludge flow rate. Any pronounced swirl in the flow pattern, while the sludge is located near web wall 49, will increase the residence time of the sludge in the rotor 37, resulting in a decreased sludge mass flow rate through the rotor 37. A high sludge circulation rate is desirable, because greater impact fragmentation forces are developed in the stator slots 61, and also because the sludge then has a greater number of passes through the stator 59, for a given overall residence time in the tank 10.

Also shown in FIG. 7, is an oxygen injection passage system comprising an annular passage 96, located within each shroud wall, 63 or 67. An oxygen supply pipe 92, extends between each shroud wall, and the side wall 11 of the tank 10. An external pump (not shown) can be mounted on the tank 10, to pump oxygen through each pipe 92, and into the associated annular passage 96. Jet-type orifices 90, extend from each passage 96, to the inner edge of the shroud wall, whereby oxygen can be discharged into the sludge as it flows into the rotor 59. The oxygen supply can be either pure oxygen, or oxygen contained in air.

The purpose for introducing oxygen into the sludge stream is to promote aeration of the sludge. Thus, while the sludge is residing within the tank, it can also be subjected to aeration for enhanced microbial activity of the sludge particulates. The oxygen is introduced to the sludge particles just prior to their fragmentation in the stator slots 61. It is theorized, that at the instant of sludge particle fragmentation, the newly exposed sheared surfaces of the particulates or particles, will have the opportunity to come into direct contact with the oxygen molecules, so that there will be an increased level of microbial activity. The oxygen will not have to encounter the resistance of a thick water film in order to reach the particle surface. Also, the oxygen molecules and sludge particles will be in violent motion, such that the oxygen has an increased probability for striking and penetrating the sludge fragments.

FIG. 7 represents optional features usable in practice of the present invention. It should be noted that the invention can be practiced, if desired, without the FIG. 7 features.

When oxygen injection is not being used, the closed tank 10, can serve as an anaerobic digestion tank. A vent opening 86, as shown in FIG. 1, may be provided in tank cover 15, for removal of methane gas produced during the anaerobic digestion process. The anaerobic digestion process is aided by maintaining the tank sludge at a temperature of approximately 90° F. to 95° F. A jacket 84, can additionally be provided on the exterior of tank 10, for circulation of a heating or cooling liquid, around the tank wall 11. It is further contemplated that the flow of liquid through the jacket 84, can be thermostatically controlled to achieve a desired sludge temperature within the tank 10.

Figure 8:
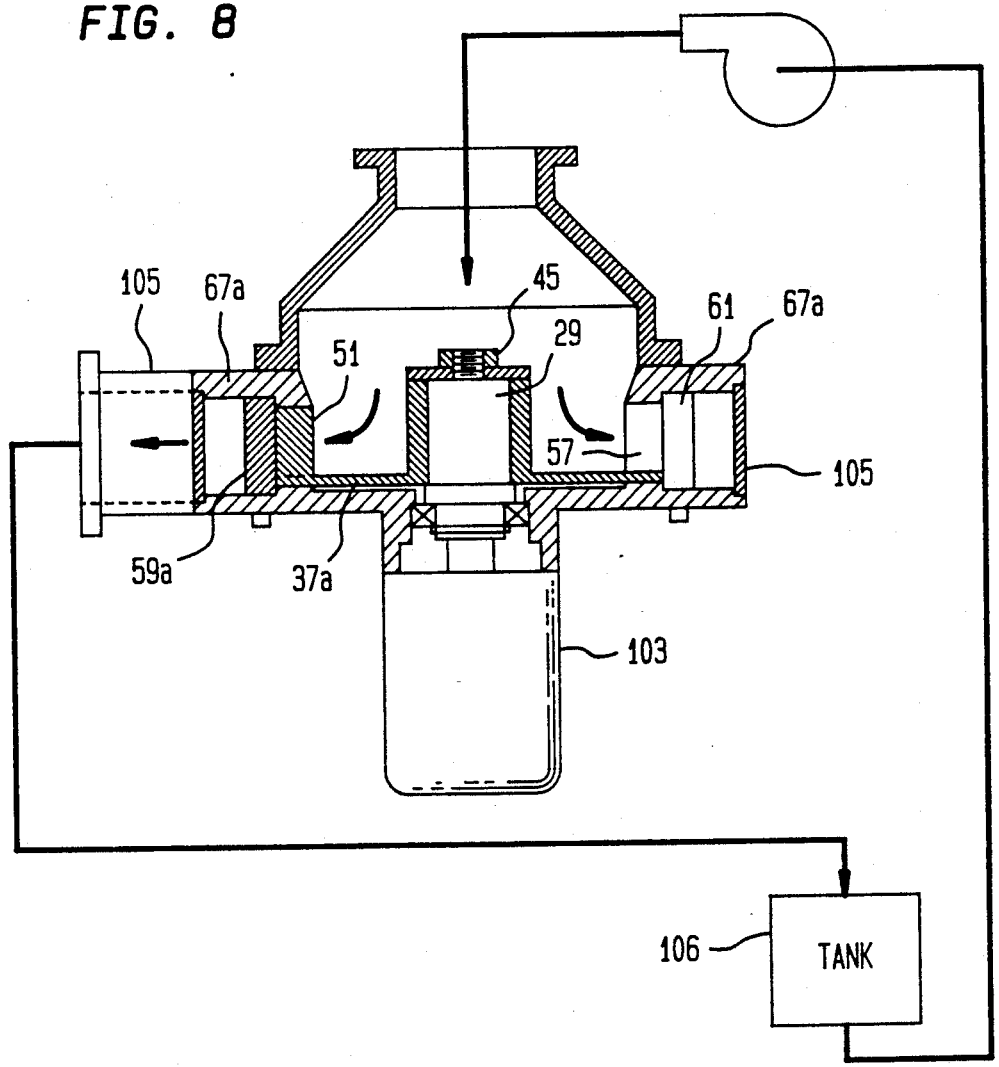
FIG. 8, is a sectional view taken through another apparatus, embodying features of the present invention.

FIG. 8, is a sectional view taken through another apparatus, embodying features of the present invention.

FIG. 8, illustrates another rotor-stator assembly usable in a liquid sludge line, rather than in a tank, in order to achieve sludge particle fragmentation. In this case, the sludge enters the rotor 37a, through a central opening in shroud wall 67a. Slots in the rotor 37a, and in the surrounding stator 59a, produce the desired sludge particle fragmentation action, as discussed extensively above. Rotor 37a, can be directly driven or belt-driven. As shown, shaft 29, is directly connected to an external drive motor 103. Stator 59a, is located within a scroll-shaped housing, designated generally by numeral 105.

The FIG. 8 sludge particle fragmentation apparatus, can be located in a line, extending from a sludge source to a dewatering unit. Alternately, the fragmentation apparatus, can be arranged in a recirculation line associated with a sludge storage tank, depicted here as 106. The sludge would be fragmented and recirculated back to the storage tank 106. A separate line would then go from the tank 106 to a dewatering apparatus (not shown).

The present invention relates to a method of fragmenting sludge particles, and also to an apparatus useful in practice of the method. Features of the invention are recited in the appended claims. The drawings contained herein necessarily depict specific embodiments of the apparatus, useful in practice of the present invention. However, it will also be appreciated by those skilled in the arts pertaining thereto, that the present invention can be practiced in various forms and configurations. Further, the previous detailed description of the preferred embodiments of the present invention, is presented for purposes of clarity of understanding only, and no unnecessary limitations should be understood or implied therefrom. Finally, all appropriate mechanical and functional equivalents to the above, which may also be obvious to those skilled in the arts pertaining thereto, are considered to be encompassed within the claims of the present invention.

What is claimed is:

1. Apparatus for treating waste water sludge, comprising separating means for separating the sludge into a plurality of separate streams, said separating means including a plurality of confined passageways, each of said passageways being sized and shaped so as to receive a corresponding stream of sludge; propelling means for propelling each of said streams of sludge through and from a corresponding one of said passageways, thereby creating a plurality of propelled streams of sludge; and shearing means for mechanically shearing solid particles contained in said propelled streams of sludge to such an extent that at least some of said solid particles are broken into smaller-sized fragments, whereby liquid contained in pores of said fragmented particles is released, said shearing means including impinging means for permitting at least some of said solid particles contained in said propelled streams of sludge to impinge thereon, and said impinging means including a plurality of contact surfaces separate from said passageways and positioned in close proximity thereto, whereby each of said propelled streams of sludge impinges on at least one of said contact surfaces immediately after being propelled from a corresponding one of said passageways.

2. Apparatus according to claim 1, wherein said separating means further includes aerating means for aerating the sludge.

3. Apparatus according to claim 1, further comprising an annular rotor, said rotor being mounted for rotation about an axis of rotation and having a central axially-extending opening, an inner circumferential surface delimiting said opening, and an outer circumferential surface delimiting a periphery of said rotor, said passageways extending generally radially through said rotor from said inner circumferential surface thereof to said outer circumferential surface thereof.

4. Apparatus according to claim 3, wherein said passageways include a first series of slots provided in said rotor, each slot of said first series of slots being sized and shaped so as to discharge a corresponding stream of sludge in a generally radial direction relative to said axis of rotor upon the rotation of said rotor about said axis.

5. Apparatus according to claim 4, further comprising an annular stator extending cricumferentially about said rotor and including a second series of slots, each slot of said second series of slots constituting at least one of said contact surfaces and intermittently communicating with each slot of said first series of slots as said rotor rotates relative to said stator.

6. Apparatus according to claim 5, wherein each slot of said second series of slots is elongated and is delimited by a wall having a length selected so as to permit the repeated impingement of a corresponding one of said propelled streams of sludge thereon, thereby increasing the number of solid particles impinging on said impinging means.

7. Apparatus according to claim 5, wherein each slot of said second series of slots is elongated and is delimited by a wall having a length selected so as to permit the repeated impingement of a corresponding one of said propelled streams of sludge thereon, whereby at least some of the impinged particles are subjected to multiple impingements.

8. Apparatus according to claim 5, wherein said passageways include a third series of slots provided in said rotor below said first series of slots, each slot of said third series of slots being sized and shaped so as to discharge a corresponding stream of sludge in a generally radial direction relative to said axis of said rotor upon the rotation of said rotor about said axis, and wherein said stator includes a fourth series of slots positioned below said second series of slots, each slot of said fourth series of slots intermittently communicating with each slot of said third series of slots as said rotor rotates relative to said stator.

9. Apparatus according to claim 8, wherein said propelling means includes rotating means for rotating said rotor about said axis thereof.

10. Apparatus according to claim 9, wherein said propelling means further includes a first propeller positioned above said rotor in axial alignment with said opening therein and a second propeller positioned below said rotor in axial alignment with said opening therein.

11. Apparatus according to claim 8, wherein each slot of said first and third series of slots has a non-radial orientation relative to said axis of said rotor.

12. Apparatus according to claim 11, wherein each slot of said second and fourth series of slots has a radial orientation relative to said axis of said rotor.

13. Apparatus according to claim 11, wherein each slot of said second and fourth series of slots has a non-radial orientation relative to said axis of said rotor.

14. Apparatus according to claim 13, wherein each slot of said second and fourth series of slots includes an inlet end having one non-radial orientation relative to said axis of said rotor and an outlet end having another non-radial orientation relative to said axis of said rotor.

15. Apparatus according to claim 8, wherein each slot of said first and third series of slots has a first width and wherein each slot of said second and fourth series of slots has a second width which is substantially the same as said first width.

16. Apparatus according to claim 8, wherein each slot of said first and third series of slots has a first width and wherein each slot of said second and fourth series of slots has a second width which is greater than said first width.

17. Apparatus according to claim 8, wherein each slot of said first and third series of slots has a first width and wherein each slot of said second and fourth series of slots has a second width which is less than said first width.

18. Apparatus according to claim 5, wherein each slot of said first series of slots has a non-radial orientation relative to said axis of said rotor.

19. Apparatus according to claim 18, wherein each slot of said second series of slots has a radial orientation relative to said axis of said rotor.

20. Apparatus according to claim 18, wherein each slot of said second series of slots has a non-radial orientation relative to said axis of said rotor.

21. Apparatus according to claim 20, wherein each slot of said second series of slots includes an inlet end having one non-radial orientation relative to said axis of said rotor and an outlet end having another non-radial orientation relative to said axis of said rotor.

22. Apparatus according to claim 5, wherein each slot of said first series of slots has a first width and wherein each slot of said second series of slots has a second width which is substantially the same as said first width.

23. Apparatus according to claim 5, wherein each slot of said first series of slots has a first width and wherein each slot of said second series of slots has a second width which is greater than said first width.

24. Apparatus according to claim 5, wherein each slot of said first series of slots has a first width and wherein each slot of said second series of slots has a second width which is less than said first width.

25. Apparatus according to claim 5, wherein said propelling means includes rotating means for rotating said rotor about said axis thereof.

26. Apparatus according to claim 25, wherein said propelling further includes at least one propeller spaced from said rotor and positioned in axial alignment with said opening in said rotor, whereby said at least one propeller supplies the sludge to said rotor in a generally axial direction relative to said axis of said rotor.

27. Apparatus according to claim 26, further comprising inhibiting means for inhibiting the sludge from swirling as it is supplied to said rotor by said at least one propeller.

28. Apparatus according to claim 27, wherein said inhibiting means includes a plurality of stationary vanes, each vane extending in a generally radial direction relative to said axis of said rotor.

29. Apparatus according to claim 26, further comprising aerating means for aerating the sludge as it is supplied to said rotor by said at least one propeller.

30. Apparatus according to claim 29, wherein said aerating means is connected to a source of oxygen, whereby the sludge is aerated with oxygen.

31. Apparatus according to claim 29, wherein said aerating means is connected to a source of air, whereby the sludge is aerated with air.

32. Apparatus according to claim 1, wherein said receiving means includes a pipeline.

33. Apparatus according to claim 5, further comprising circulating means for circulating the sludge from said stator back to said rotor.

34. Apparatus according to claim 5, wherein said rotor and said stator are mounted in receiving means for receiving the sludge.

35. Apparatus according to claim 34, wherein said receiving means includes a storage tank.

36. Apparatus according to claim 35, wherein said storage tank is closed and includes heating means for heating the sludge contained in said storage tank and removing means for removing gas produced by the sludge contained in said storage tank.

* * * * *